Sept. 27, 1938.    F. E. STAHL    2,131,713
ANTISKID CROSS CHAIN
Filed June 1, 1937    2 Sheets-Sheet 2
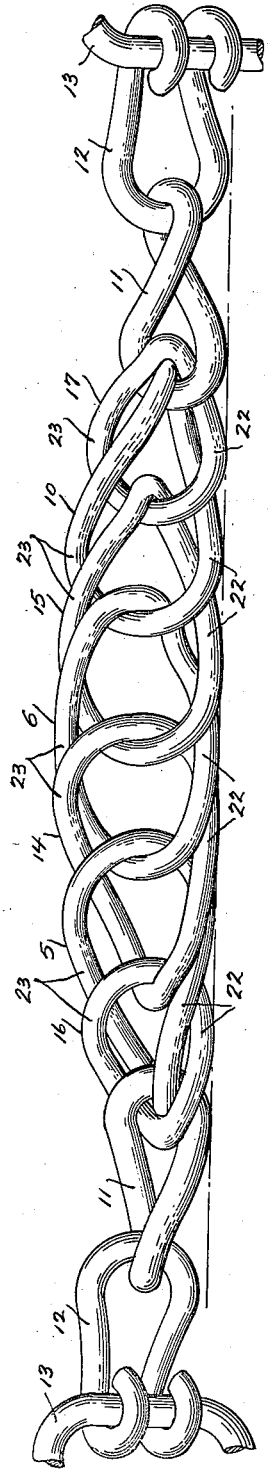
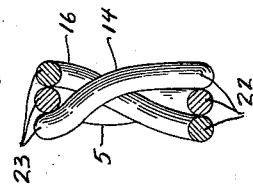
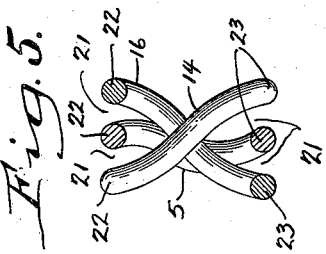
Inventor,
FRANK E. STAHL
by J. W. M. Ellis
Attorney.

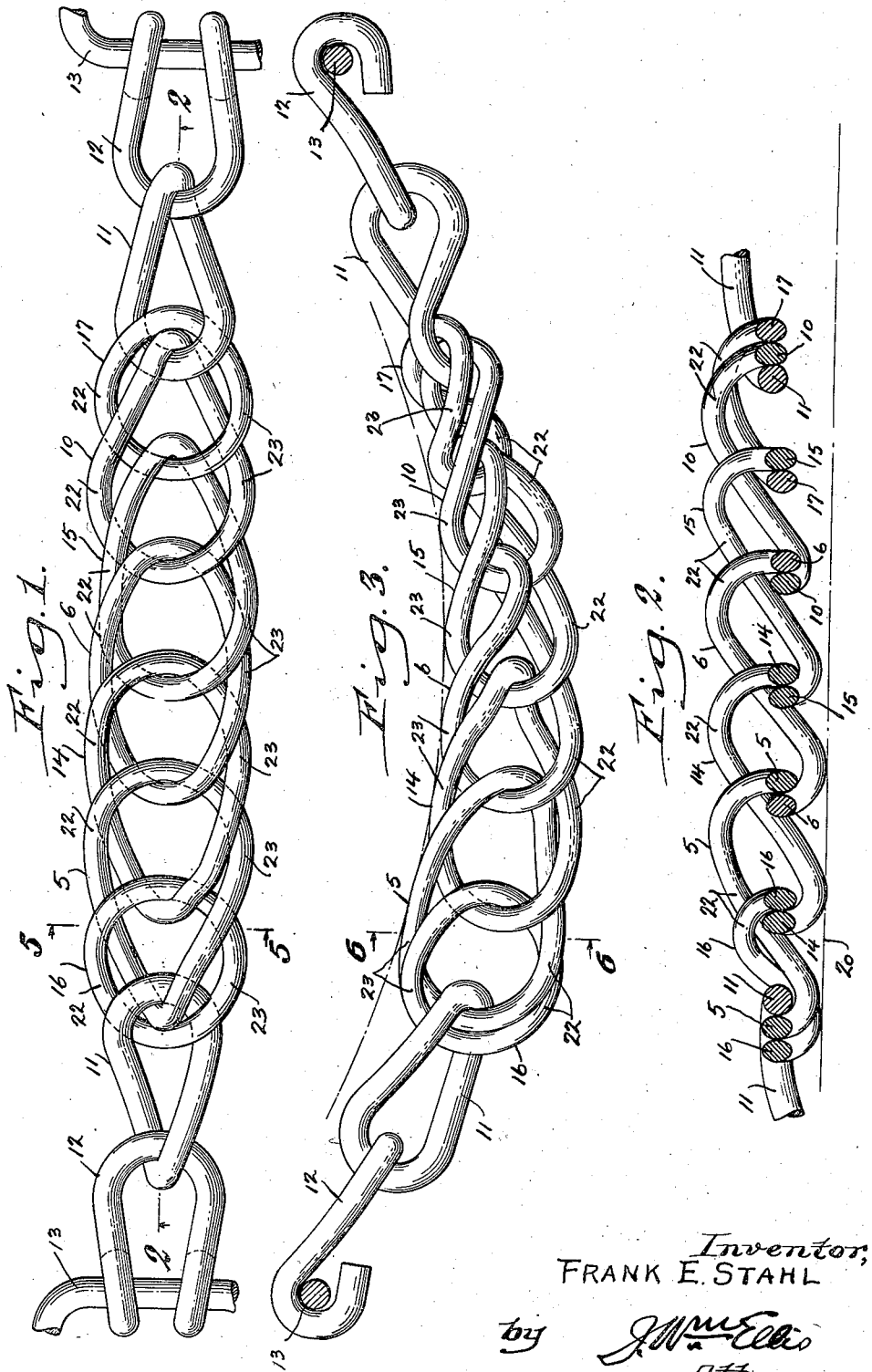

Patented Sept. 27, 1938

2,131,713

UNITED STATES PATENT OFFICE 2,131,713

ANTISKID CROSS CHAIN

Frank E. Stahl, Tonawanda, N. Y.; Lillie M. Stahl administratrix of said Frank E. Stahl, deceased Application June 1, 1937, Serial No. 145,715

5 Claims. (Cl. 152—232)

My invention relates in general to chains for antiskid or traction devices for use on tires and more particularly to cross chains of large size for such devices.

It is well known that at present large pneumatic tires are being used on implements for use on farms and road work such, for instance, as tractors, and with such use some means must be provided for insuring proper and effective traction.

One of the principal objects of my invention has been, therefore, to provide a heavy duty cross chain for use on the tires of tractors or the like which will produce proper traction.

Another object has been to provide a cross chain having large links made from wire of relatively small diameter, thus making a chain which is very flexible, conforming itself readily to the tire without injury thereto under working conditions.

Moreover, it has been an object to provide a cross chain formed of two separate chains, the ends thereof being connected together and the links being interlaced, whereby when in traction position, the links will present a substantially unbroken surface to the road.

Furthermore, my invention is so designed that when it is being brought into its traction position, the links thereof will be relatively rotated on ther major axes and thus have their sides forced toward each other and closely nested, whereby the substantially unbroken, nested arrangement above referred to will be brought about.

Moreover, I place an initial twist in the chains of my device when attaching it to side chains of an antiskid device, so that when the chain is being brought to its traction position, the links thereof will start to wind or be rotated on their major axes starting at one end, whereby the desired traction surface will be presented to the road, depending somewhat upon the amount of traction needed.

Furthermore, my device is very strong and durable and one which may be used on any form of antiskid device.

The above objects and advantages have been accomplished by the device shown in the accompanying drawings, of which:

Fig. 1 is a top, plan view of my invention, viewed from the tire engaging side.

Fig. 2 is a sectional, side elevation of my cross chain taken on line 2—2 of Fig. 1 arranged, for convenience of illustration, along a straight line.

Fig. 3 is a side elevation of my device in position where it has been moved to one of its partial traction positions.

Fig. 4 is a side elevation of my invention showing all of the links in the position assumed when the cross chain is in its full traction position, the links being shown along a straight line, for clearness of illustration.

Fig. 5 is a transverse, sectional view of my invention with the links thereof in normal positions, taken on line 5—5 of Fig. 1.

Fig. 6 is a view of my invention similar to Fig. 5 but is taken on line 6—6 of Fig. 3, and when the links are in their traction positions.

My device comprises a plurality of links arranged in two chain assemblies, the links of each assembly being interlaced with the links of the other assembly and each chain assembly being independently attached to the hook link at each end of the device. Each of the links of my cross chain is large and made from wire having a relatively small cross-sectional area.

In the drawings, the main chain assembly comprises links 5, 6, and 10, each link being suitably twisted on its major axis and interengaged with the next adjacent link. The middle link 6 is engaged with the end links 5 and 10, one of each of which is located at each side of the middle link 6. At each end of this assembly is provided a hook link 11 which is also twisted on its major axis. Each of these hook links is connected or engaged with a hook 12 by which my cross chain is attached to the links 13 of the side chains of an antiskid device or to the plates (not shown) of an emergency antiskid device.

The intermediate chain assembly comprises preferably two links 14 and 15 which are interengaged at the center of the cross chain, as shown. Each of the links 5, 6, 10, 14, and 15, as well as the hook links, are preferably oval in form, each having a longitudinal axis of greater dimensions than the lateral axis. The intermediate chain assembly is formed at its ends with ring-shaped links 16 and 17 which serve to connect this assembly with the hook links 11. The combined length of this intermediate chain assembly is substantially the same or preferably slightly greater than the length of the main chain assembly. The increased length is preferably for the reason that it is desirable that the ring-shaped links 16 and 17 be disposed around the outside ends of the links 5 and 10, respectively, of the main chain assembly, as clearly shown in the drawings.

The links 14 and 15 of the intermediate chain assembly are connected together, as hereinbefore pointed out, at the center of the cross chain, and are also interwoven with respect to the central link 6 of the main chain assembly, the links 16 and 17 being so proportioned as to hold the links of the two chain assemblies in definite spaced relation. The outer ends of the links 14 and 15 of the intermediate chain assembly are interlaced through the outer links 5 and 10 of the main chain assembly, as clearly shown in the drawings.

As hereinbefore pointed out, the links of both chain assemblies, as well as the hook links 11, are twisted. Such twisting is produced, in the course of manufacture, by placing the hook links 11 at the ends of the cross chain in a suitable device (not shown), and then relatively rotating them. This twisting is carried on to such a degree that when the completed chain is attached to the side chains 13, the hook links 11 are relatively rotated through an angle of substantially 180° and, after such rotation, there will be some normal freedom of motion of the individual links because of the spaces indicated at 21. These twists are so formed that one extreme end of the link is at an angle of substantially 90°, or more, with the other extreme end of the link, such angle varying in the several links but approximating 90°. This twist is clearly shown in the drawings, and in particular in Fig. 2. When the chain is in the normal position shown in Fig. 1, there will naturally be considerable space between the side portions of the links of the main assembly and the links of the intermediate chain assembly, as clearly shown at 21 in Fig. 5 and as also indicated in Fig. 2. As just above pointed out, when the cross chains are assembled to the side chains 13 of an antiskid device, there will be an initial twist in the cross chain between its ends when the hooks 12 are engaged with the side chains 13 or side plates (not shown) of the antiskid device and are in their normal positions. This initial twist, which is counterclockwise when viewed from the right hand side of Figs. 1 and 2, will produce a condition like that shown in Fig. 2 when the chain is resting upon the tire. This section is taken on line 2—2 of Fig. 1 and shows how the sides 22 of the links 16, 5, and 14 on the far side of the chain will be in contact with the line 20, representing the road, the chain here represented being shown, for convenience of illustratration, in straight line form instead of slightly curved as it would normally be. The initial twist in the cross chain, as viewed from the right hand end of the figures, being counterclockwise, any pressure, therefore, which is brought to bear upon the sides 22 of the links starting with the links 16, 5, and 14, or any force which would tend to rotate them in clockwise direction, when viewed from the right hand end, as shown in the drawings, will serve to first take up the spaces indicated at 21 in Fig. 5 and in doing so the links above mentioned will be relatively rotated so as to bring their sides 22, shown at the top of Fig. 1 and in elevation in Fig. 2, in contact with the road. The degree of rotative movement will, of course, be counteracted and resisted by the engagement of the ends of the cross chain with the side chain 13 of the antiskid device. The left hand end of the cross chain, therefore, as shown in Fig. 2, will be rotated substantially to the position shown in Fig. 3. If the amount of traction produced when the cross chain is in its partial traction position shown in Fig. 3 is not sufficient and additional traction is needed, then the three links above mentioned will be further rotated in clockwise direction (as viewed from the right hand end of the chain) and the spaces 21 between the adjacent sides 22 of the other links of the cross chain will be closed up by the relative rotation of successive links so as to bring the links into nested relation with each other. This relative rotation of the links will cause the entire cross chain to be so twisted as to bring the sides 22 of all of the links into traction position and so into contact with the road along the entire length of the cross chain, as clearly shown in Fig. 4. In this figure it will be seen that all of the sides 22 of the links of both chain assemblies which are toward the road are in traction position and form a substantially unbroken line of contact with the road or material over which the tire bearing my device is traveling, thus giving maximum traction. When the links of my cross chain are in their nested and closed positions, hereinbefore described, their adjacent surfaces are brought in contact with each other, as clearly shown by the sectional view of Fig. 6.

The operation of my device, as just above described, is that which results when the tire bearing the same is rotated in counterclockwise direction when viewed from the right hand end of the chain, and it is obvious that the sides 23 of the links will be brought into action starting with links 17, 10, and 15 at the opposite end of the chain when the tire bearing the same is rotating in clockwise direction, as viewed from the same end of the chain.

As soon as the cross chains have been moved out of contact with the road or out of the material over which the tire is traveling, they will again assume their substantially normal positions, shown in Figs. 1 and 2. When assuming such positions, the links of the two chain assemblies will be relatively rotated back to their normal positions and otherwise relatively moved, and during such movement, the spaces between the links will be cleared or freed of any mud or other accumulation packed in between the links during movement of the device over the road.

Obviously, the links of the two chain assemblies will, under normal conditions, be loosely connected and will, therefore, be very flexible, so that the links will be free to contact flatly with the tire, thus causing no injury to the tire. It will also be understood that due to the initial twist in the cross chain, above described, the links will be held in such relative positions as to be in readiness at all times when traction is needed to closely nest and turn so as to present the sides of the links to the road. As above set forth, the amount of twist of the cross chain produced by the amount of relative rotation of the adjacent links will determine the number of links which are brought into traction position and, therefore, the amount of traction offered by the device.

While I have shown and described my cross chain for use on large tires such as used on tractors, it is obvious that the links of the cross chain may be made smaller and be adaptable for use on relatively smaller tires.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. An antiskid cross chain, comprising a main chain assembly and an intermediate chain assembly, each assembly formed of interengaged, twisted links, the links of the intermediate assembly being interlaced with the links of the main assembly, each of the links being so formed that its extreme ends are at an angle of substantially 90° to each other, so that the end links of the chain may be placed at an angle of substantially 180° from each other, thereby placing an initial twist in the chain between its ends, whereby when the chain is placed in traction service the adjacent links will be nested closely together and present a substantially unbroken surface.

2. An antiskid cross chain, comprising a main chain assembly formed of twisted links, a hook link at each end of the main chain assembly, an intermediate chain assembly formed of twisted links, the links of both chain assemblies being interlaced, and a ring link at each end of the intermediate chain assembly, each of said ring links contacting with and being attached to one of said hook links of the main chain assembly, whereby the intermediate chain assembly will take its share of the load placed upon the cross chain.

3. An antiskid cross chain, comprising a main chain assembly and an intermediate chain assembly, each assembly formed of large, interengaged, twisted links made of wire having a relatively small cross-sectional area, the links of the intermediate assembly being interlaced with the links of the main assembly, each of the links being so formed that its extreme ends are at an angle of substantially 90° to each other, so that the end links of the chain may be placed at an angle of substantially 180° from each other, thereby placing an initial twist in the chain between its ends, whereby when the chain is placed in traction service the adjacent links will be nested closely together and present a substantially unbroken surface.

4. An antiskid cross chain, comprising a main chain assembly and an intermediate chain assembly, each assembly formed of interengaged, twisted links, the links of the intermediate assembly being interlaced with the links of the main assembly, each of the links being so formed that its extreme ends are at an angle of substantially 90° to each other, so that the end links of the chain may be placed at an angle of substantially 180° from each other, thereby placing an initial twist in the chain between its ends, and means for limiting the rotation of the cross chain upon its axis.

5. An antiskid cross chain, comprising a main chain assembly formed of twisted links, a hook link at each end of the main chain assembly, an intermediate chain assembly formed of twisted links, the links of both chain assemblies being interlaced, and a ring link at each end of the intermediate chain assembly, each of said ring links contacting with and being attached to one of said hook links of the main chain assembly, each of the links being so formed that its extreme ends are at an angle of substantially 90° to each other, so that the end links of the chain may be placed at an angle of substantially 180° from each other, thereby placing an initial twist in the chain between its ends.

FRANK E. STAHL.